Patented Oct. 1, 1935

2,015,743

UNITED STATES PATENT OFFICE 2,015,743

AZO DYE AND METHOD FOR ITS PREPARATION

Miles Augustinus Dahlen and John Elton Cole, Wilmington, Del., assignors to E. I. du Pont de Nemours & Company, Wilmington, Del., a corporation of Delaware No Drawing. Application May 27, 1932, Serial No. 614,035

15 Claims. (Cl. 260—95)

This invention relates to new azo dyestuffs which are fast to washing and light and which yield valuable pigments or fast dyeings when prepared on the fiber.

It is an object of this invention to produce new azo dyes either as insoluble pigment colors or as dyes developed on the fiber. A further object is to produce azo dyes, particularly oranges, scarlets and reds, having good fastness to light, washing, soaping, chlorine, and kier-boiling. Additional objects will appear hereinafter.

These objects are attained by the present invention wherein an azo dye of the following general formula is produced:

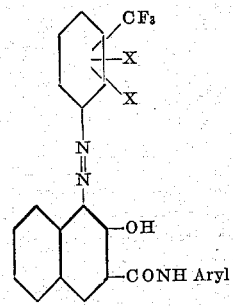

in which X is either hydrogen or chlorine; and "Aryl" refers to a radical of the benzene, diphenyl, or naphthalene series not containing a solubilizing group, but which may have substituted thereon groups such as halogen, alkyl, alkoxyl, alkylmercapto, nitro, and anilido-carboxy (—CONH $C_6H_5$).

These pigments and dyes are produced by coupling a diazotized amine of the following general formula:

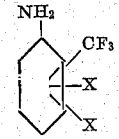

to an arylamide of beta-hydroxynaphthoic acid of the following general formula:

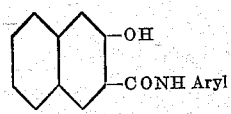

The aromatic amines referred to above may be obtained by various processes, one of which is as follows:

Benzotrichloride, $C_6H_5CCl_3$, or benzotrichloride which has been further substituted by the introduction of one or two chlorine atoms, is treated by suitable methods to replace the —$CCl_3$ radical by a —$CF_3$ radical. This may be accomplished by the action of anhydrous hydrofluoric acid in the presence of catalysts such as antimony trifluoride. By this method, benzotrifluoride or mono- or dichlorinated benzotrifluorides are obtained.

The benzotrifluoride or mono- or dichlorobenzotrifluoride is nitrated under suitable conditions to yield a mono-nitro-derivative. By the usual reduction methods, such nitro-derivatives may be converted to the corresponding aromatic amines of the general formula given above.

It will be readily understood by one skilled in the art that various amino derivatives of benzotrifluoride and mono- and dichlorinated benzotrifluorides may be obtained, and the amino compounds thus obtained will have various configurations in accordance with their respective methods of preparation. Such variable configurations in the aromatic amines make possible the preparation of a large number of new dyestuffs according to the present invention.

The invention will be more completely understood by reference to the following examples, in which the parts are given by weight:

Example 1

Cotton yarn, after being boiled and dried, was thoroughly impregnated with an aqueous grounding liquor containing in one thousand parts of solution:

11.85 parts of the beta-naphthalide of 2.3-hydroxynaphthoic acid
50 parts of sodium hydroxide solution of 34° Bé. strength
30 parts of Turkey red oil After impregnation, the yarn was wrung out as well as possible, rinsed; and without being dried, developed in a diazo solution as follows:

3.22 parts of meta - amino - benzotrifluoride (which may be prepared as described by Swarts in Bull. Acad. Roy. Belgique Ser. 3, 35 394) were dissolved in 50 parts of hot water to which had been added 6.5 parts of hydrochloric acid of 22° Bé. strength. The solution was cooled to 10° C. by the addition of ice, and the base diazotized by the addition of a solution of 1.44 parts of sodium nitrite in 10 parts of water. The temperature was held at 10° C., by the addition of ice, until diazotization was complete. The diazo solution was then diluted to a total volume of 1000 parts, filtered, and the mineral acidity neutralized by the addition of sodium acetate as required.

When development of the dyestuff was complete, the yarn was removed from the developing bath, rinsed, treated with hot soap solution, again rinsed, and dried.

By this procedure a red dyeing of excellent fastness to washing, light and kier-boiling was obtained. The dyestuff had the probable formula:

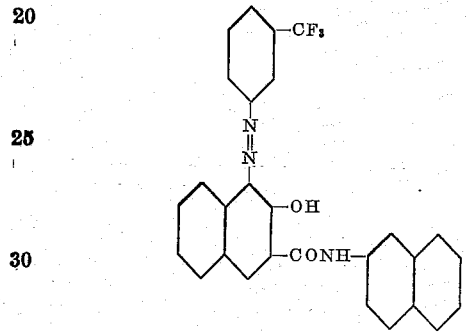

*Example 2*

Cotton yarn was "padded" as in Example 1, with the following grounding solution:
- 10.5 parts of the anilide of 2:3-hydroxynaphthoic acid
- 17.5 parts of sodium hydroxide solution of 34° Bé.
- 30 parts of Turkey red oil
- 8 parts of aqueous formaldehyde solution of 30% strength
- Water to give a total of 1000 parts of solution.

The impregnated yarn was developed in the diazo solution prepared from meta-amino-benzotrifluoride, as in Example 1.

By this procedure, a brilliant scarlet dyeing of excellent fastness to washing, light, and kier-boiling was obtained. By substituting the o-anisidide of 2,3-hydroxynaphthoic acid in the above example, a bright red dyeing of excellent fastness was obtained.

*Example 3*

A solution of the meta-nitranilide of 2,3-hydroxy-naphthoic acid was prepared as follows:
7.4 parts of the arylamide, 14 parts of sodium hydroxide solution of 20% strength, and 25 parts of Turkey red oil were stirred to a smooth paste. 200 parts of hot water were added, and the solution filtered. The filtrate was made acid to litmus papers by the addition of acetic acid.

A solution of diazotized meta-amino-benzotrifluoride was prepared as in Example 1. An equivalent quantity of this diazo solution was then added to the suspension of the arylamide. The mass was stirred for one-half hour. Sufficient sodium hydroxide solution was then added to make the mass alkaline to Clayton yellow paper. The precipitated pigment was filtered, washed thoroughly with water, and dried. It was then recrystallized from glacial acetic acid.

The pigment obtained by the above process was a brick red powder, melting at 258–259° C. A solution in sulfuric acid was of a cherry red color. The following was the probable formula of this material:

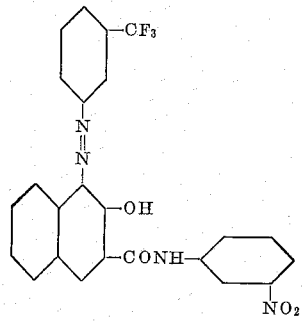

*Example 4*

45 parts of ortho-chloro-benzotrifluoride (prepared by the action of anhydrous hydrofluoric acid on ortho-chloro-benzotrichloride under the influence of a catalyst) were stirred with 47.5 parts of sulfuric acid of 95% strength at 20° C. To the mass was added a mixture of 16.5 parts of nitric acid of 100% strength and 35 parts of sulfuric acid of 95% strength, holding the temperature at 18–20° C. After stirring for two hours, the reaction mass was diluted with ice and water, and the mono-nitrated product separated as a yellow solid. It was washed with water and sodium carbonate to remove adhering acid, and was then purified by distillation in a vacuum.

The nitro-compound thus obtained was reduced in the usual manner, yielding the corresponding chloro-amino-benzotrifluoride. The latter substance was a colorless liquid boiling at 99–103° C. under 6–7 mm. pressure.

19.6 parts of the chloro-amino-benzotrifluoride obtained by the above process were stirred with 50 parts of water containing 32 parts of hydrochloric acid of 37% strength. The mass was cooled to 10° C. by the addition of ice, and the base diazotized by the addition of a solution of 7 parts of sodium nitrite in 20 parts of water. When diazotization was complete, the solution was filtered and made neutral to Congo red papers by the addition of sodium acetate.

Cotton yarn was impregnated as in the above examples in a padding bath prepared from:
- 12.7 parts of the ortho-toluidide of 2,3-hydroxynaphthoic acid
- 20 parts of sodium hydroxide solution of 36° Bé. strength
- 30 parts of Turkey red oil
- Water to give a total of 1000 parts.

The padded yarn was developed in the diazo solution from the chloro-amino-benzotrifluoride prepared as above. When the formation of color was complete, the yarn was rinsed, soaped, rinsed and dried.

By this procedure, a brilliant scarlet dyeing of excellent fastness to light, washing, etc., was obtained. The dye had the probable formula:

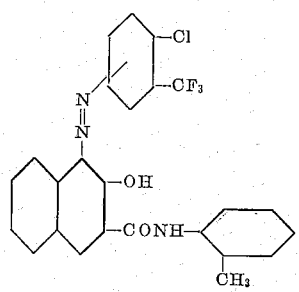

Similarly, the ortho-toluidide was substituted by the 2:3-hydroxy-napthoyl derivative of N-(p-aminobenzoyl)-aniline; in which case a bright red dyeing of excellent fastness was obtained.

Example 5

Over-chlorinated benzotrichloride of a boiling point of 139–144° C., which was probably a mixture of ortho-, meta-, and para-chloro-benzotrichlorides, was converted to the corresponding chlorinated benzotrifluoride mixture by the action of hydrofluoric acid in the presence of a catalyst. The latter product was then nitrated and reduced as in Example 4, yielding a mixture of monochloro-amino-benzotrifluorides, boiling at 88–91.5° C. at 4–5 mm. pressure.

The chloro-amino-benzotrifluoride mixture obtained as above was diazotized as in Example 4.

Cotton skeins were padded with grounding liquors prepared from various arylamides of 2:3-hydroxynaphthoic acid, and the padded yarns developed in the above diazo solution. Among the arylamides which may be used are the following: anilide, meta-nitranilide, o-toluidide, beta-naphthalide, 2,5-dimethoxy-anilide, ortho-thioanisidide, dianisidide, and 5-chloro-2-methyl-anilide.

Various colors were obtained according to the arylamide selected. The dyeings obtained showed in general excellent fastness to light, washing, and kier-boiling. Most of the colors obtained were orange, scarlet or red in shade.

Example 6

By methods similar to those described in previous examples, a mixture of dichloro-benzotrichlorides, obtained by chlorination of benzotrichloride, was converted to a mixture of amino-dichloro-benzotrifluorides. The latter base was then diazotized as before, and various padded yarns developed in the diazo solution. As in the previous examples, bright dyeings, particularly oranges, reds, and scarlets, were obtained, such dyeings showed satisfactory fastness to light, washing, soaping, chlorine, and kier-boiling.

The CF$_3$ group may occupy various positions on the phenyl nucleus, and the amino-benzotrifluoride may have substituted thereon one or two chlorine atoms as previously mentioned. The compounds may be produced by coupling on the materials to be dyed or they may be produced as insoluble pigment colors, and where reference is made to the production of these compounds in the present specification and claims it is to be understood that it pertains either to production on the fiber or apart from the fiber.

The new dyes and pigments are distinguished by their beautiful colors, usually ranging from orange to scarlet and red. They are generally fast to light, washing, soaping, chlorine, and kier-boiling and compare favorably with the usual ice colors.

As many apparently widely different embodiments of this invention may be made without departing from the spirit and scope thereof, it is to be understood that we do not limit ourselves to the specific embodiments thereof except as defined in the appended claims.

We claim:

1. A process for producing an insoluble azo dye which comprises coupling a diazotized amino-benzotrifluoride with an arylamide of 2,3-hydroxynaphthoic acid.

2. A process for producing an insoluble azo dye which comprises coupling a diazotized aminobenzotrifluoride with an arylamide of 2,3-hydroxynaphthoic acid, the arylamide being selected from the group consisting of benzene, diphenyl, and naphthalene nuclei.

3. The process of claim 2 in which the aminobenzotrifluoride has substituted thereon at least one chlorine atom.

4. A process for producing an azo dye which comprises coupling diazotized meta-amino-benzotrifluoride with the anilide of 2,3-hydroxynaphthoic acid.

5. A process for producing an azo dye which comprises coupling diazotized meta-amino-benzotrifluoride with the ortho-anisidide of 2,3-hydroxynaphthoic acid.

6. An azo dye having the following general formula:

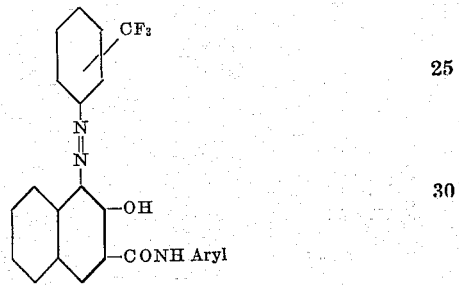

in which "Aryl" represents a member selected from the group consisting of benzene, diphenyl, and naphthalene.

7. An azo dye having the following general formula:

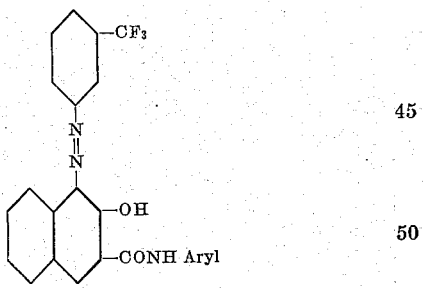

in which "Aryl" represents a member selected from the group consisting of benzene, diphenyl, and naphthalene.

8. An azo dye having the following general formula:

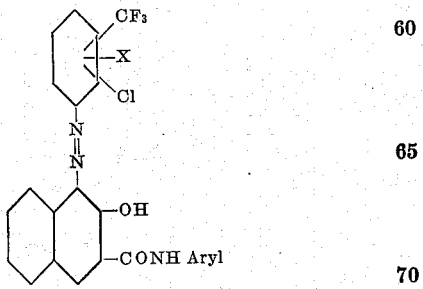

in which X represents hydrogen or chlorine, and "Aryl" represents a member selected from the group consisting of benzene, diphenyl, and naphthalene.

9. An azo dye having the following formula:

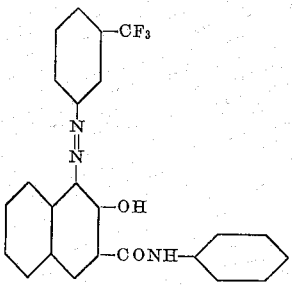

10. An azo dye having the following formula:

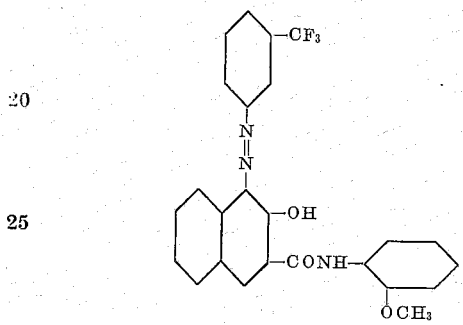

11. An azo dye having the following general formula:

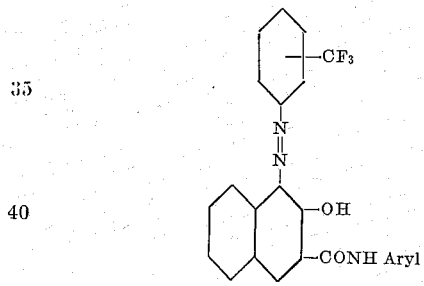

12. A process for producing an insoluble azo dye which comprises coupling a diazotized amino-benzotrifluoride, which may have chlorine groups substituted thereon, with an arylamide of 2-3-hydroxy-naphthoic acid, the arylamide nucleus of said coupling component being a member of the benzene series.

13. An azo dye having the following general formula:

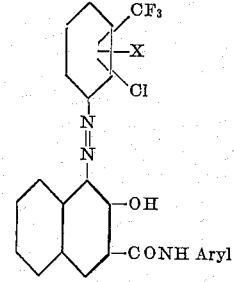

in which X represents hydrogen or chlorine and Aryl represents an aromatic nucleus of the benzene series.

14. An insoluble azo dye having the following general formula:

$$R-N=N-R'$$

in which R represents the radical of a diazotized amino-benzotrifluoride and R' represents the radical of a hydroxy-aryl-carboxylic acid.

15. An insoluble azo dye having the following general formula:

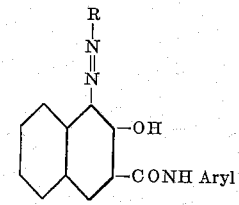

in which R represents the radical of an amino-benzotrifluoride.

MILES AUGUSTINUS DAHLEN.
JOHN ELTON COLE.